Sept. 21, 1965     K. H. SWANSON     3,206,852
DENTAL ARTICULATOR

Filed Dec. 17, 1962     2 Sheets-Sheet 1

KENNETH H. SWANSON
INVENTOR.

BY *Lyon & Lyon*

ATTORNEYS

Sept. 21, 1965 K. H. SWANSON 3,206,852
DENTAL ARTICULATOR
Filed Dec. 17, 1962 2 Sheets-Sheet 2
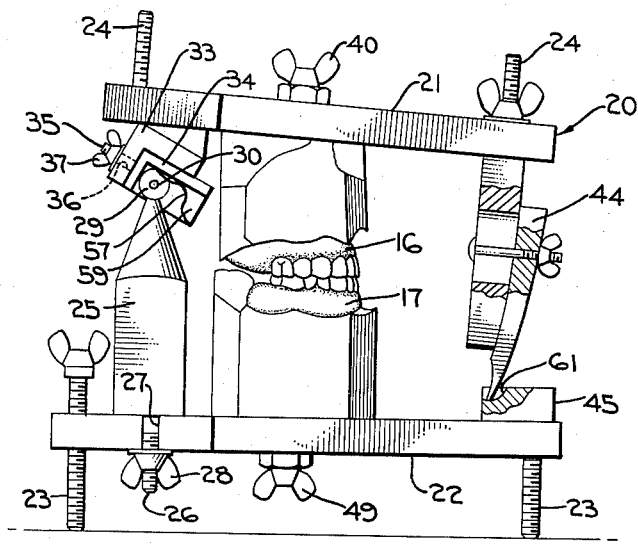
FIG. 4.
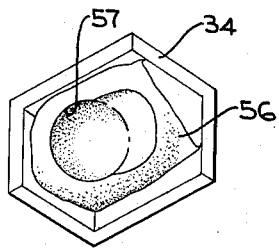
FIG. 6.
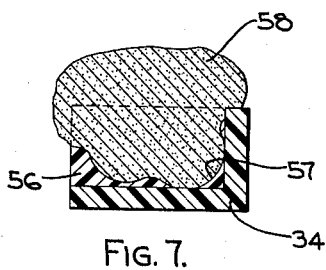
FIG. 7.
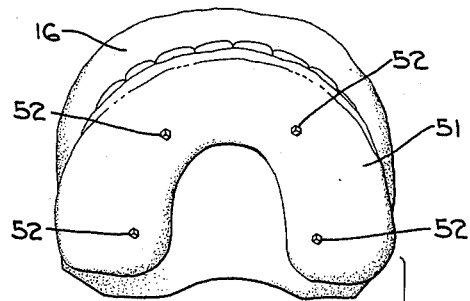
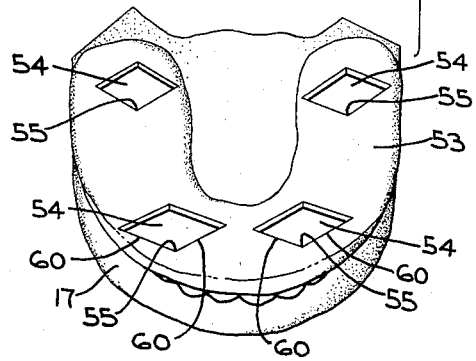
FIG. 8.
FIG. 5.
KENNETH H. SWANSON
INVENTOR.
BY *Lyon & Lyon*
ATTORNEYS 3,206,852
DENTAL ARTICULATOR
Kenneth H. Swanson, 540 North Central Bldg.,
Glendale, Calif.
Filed Dec. 17, 1962, Ser. No. 245,276
6 Claims. (Cl. 32—32)

This invention relates to a dental articulator for reproducing the relative movements of an individual person's jaws and, in particular, is directed to such a dental articulator for simulating the actual configuration of that person's hinge joints between the lower and the upper jaw such that the relative movement therebetween is closely reproduced.

There are numerous types of dental articulators and various recommended procedures to follow in using dental articulators. One important function of every dental articulator is to simulate the relative movement between the upper and lower jaws to thereby assist the dentist in constructing dentures, bridges, etc. that will have the proper spacing, clearance, meshing relation, etc. for comfortable and effective use by the person. As is well known in the art, the joint between the lower jaw and the skull is not a plain hinge joint nor is it a pair of simple and uniformly shaped ball and socket joints, but rather the joint is similar to ball and socket joints where the socket is of an irregular shape and the ball is permitted to move longitudinally within the socket as well as pivoting therein. Moreover, it is well known that the shape of the socket and its orientation relative to the jaws is somewhat different for each person and the configuration and orientation are not readily ascertainable by observing, X-raying, or testing the particular individual.

These conventional articulators have many different types of hinge mechanisms for attempting to reproduce the pivoting motion of the lower jaw relative to the skull. Some articulators employ a plain hinge between two frame members thereby producing a simple pivoting movement that is unlike the movement of a human jaw which is free to move forward and back, and laterally as well as pivoting. Other dental articulators have used hinge mechanisms employing a pair of spaced pins or balls movable within slots of limited lengths and these slots may be adjustable to appropriately orient their lengths relative to the position of the teeth to more closely simulate the orientation of that person's socket relative to their teeth. Although this pin and slot arrangement permits forward and back movement and possibly lateral movement as well as pivoting movement, these movements can only be mere approximations of the actual movements of that person's jaw since the human joint is not in the form of a straight slot and pin. Some other articulators employ a hinge mechanism resembling the human joint with cooperating parts shaped like the irregular human ball and socket. However, the irregular sockets and balls of this type of articulator are merely constructed to a shape that represents the average shape of these components in various individuals and does not truly represent the configuration or orientation of the ball and socket of any particular individual. Since the shape and orientation of this hinge in this type of articulator is merely an average it may be substantially different than that of a particular individual and thus does not serve the intended function.

While there have been various conventional methods and procedures practiced by dentists for measuring some of the charactreistics of the jaw hinge joint and movement of the lower jaw of an individual, some of these methods and procedures are useless for adjusting certain types of dental articulators due to the limited types of adjustments possible. Moreover, when adjustments can be made only an approximation of the actual characteristics of the joint and movement is achieved due to the limitations on the range and extent of adjustments. Further, the closeness of the approximation that is made depends on the particular skill, experience, patience and other abilities of the individual dentist as well as being limited by the physical limitations of the dental articulator. Thus, the reproduction of the jaw movements of a particular individual on a dental articulator might well depend as much on the ability of the dentist as the physical limitations of that articulator.

Although it might well be possible for a particular dentist to perform numerous tests, procedures, X-raying, etc. and then nearly accurately reproduce an individual's jaw hinge joint by, for example, carving the joint components out of a suitable material, such a method would be extremely expensive and time consuming. Again, the quality of results would depend on the ability of the individual dentist.

Accordingly, it is a principal object of this invention to provide a novel form of dental articulator and method for using same whereby the movements of a particular individual's jaw may be reproduced by simulating the actual construction of that individual's joints between the lower jaw and the skull.

Another object of this invention is to provide a novel form of dental articulator that employs a formable material shaped to simulate the particular configuration of the sockets of an individual person's ball and socket joints between the upper and lower jaws.

A further object of this invention is to provide a dental articulator which is usable for reproducing the relative movement of a particular individual's jaws by recording such movement and causing the articulator to follow such movement for in turn causing a formable material to be appropriately arranged to simulate the actual configuration of that individual person's joint between the lower jaw and the skull.

A still further object of this invention is to provide a novel form of dental articulator and method for using and adjusting same whereby the dental articulator may be appropriately adjusted to simulate the actual lateral distance between the ball and socket type joints connecting the lower jaw to the skull of a particular individual and wherein the configuration of those ball and socket joints may be simulated in an unrestricted fashion by appropriately forming a formable material into a socket shaped configuration; the steps of such method of using the articulator being relatively simple to perform and well within the abilities of at least most dentists. Still another object of this invention is to provide such a method which may be readily used with a minimum of instruction and practice beyond the normal knowledge of procedures and method used by dentists.

Still a further object of this invention is to provide a novel form of dental articulator that is relatively inexpensive, relatively easy to use, and requires a very minimum of additional devices or materials for its use.

Other and more detailed objects and advantages of this invention will appear from the following description and the accompanying drawings.

In the drawings:

FIGURE 4 is an elevation view of the dental articulator illustrating the final condition thereof after completion of the steps and adjustments needed such that the articulator is ready for use in constructing the desired dentures, bridges, etc.

FIGURE 5 is an exploded view of a pair of upper and lower plates used in the person's upper and lower jaws and in the dental articulator for accomplishing certain portions of the adjustment of the dental articulator.

FIGURE 6 is a perspective view of one of the open boxes used on the articulator and containing a material appropriately formed to the shape of a socket.

FIGURE 7 is a sectional elevation of the box and material shown in FIGURE 6 with a die being made of the shape of the formed material shown in FIGURE 6.

FIGURE 8 is an exploded view illustrating the die formed in FIGURE 7 being inserted into a material in an open box to reproduce a hard set configuration identical to that shown in FIGURE 6 as formed in the formable material.

Figure 1:
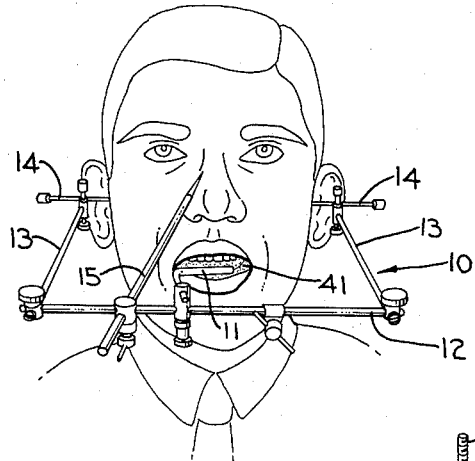
FIGURE 1 is an elevation view of a face bow being used on a patent to determine certain measurements and relationships for use in adjusting a dental articulator of this invention.

Referring now in particular to FIGURE 1, a procedure and apparatus is used which is relatively conventional for determining the hinge axis for the jaw of the particular person. A conventional face bow, generally designated 10, is appropriately mounted and supported in a person's mouth by support rod 11 supporting the lateral rod 12 and a pair of extension rods 13 are adjustably mounted on lateral rod 12. A pointer 14 is adjustably mounted near the end of extension rod 13 and by having the person appropriately move his lower jaw the extension rods 13 and pointers 14 may be adjusted so that the pointers 14 are aligned with the hinge axis of the joint between the lower jaw and the skull in the most retruded position. This location is known as either the "centric" position or, perhaps more accurately, as the "terminal hinge" position of the joint. A pointer rod 15 is adjustably mounted on lateral rod 12 for positioning at a particular location on or near the nose of the person so that the particular setting of the face bow and the relationship with the person's mouth may be subsequently reproduced for various known purposes. Thus, by using face bow 10 or other similar devices, the particular location and spatial relation of the hinge axis of that person with respect to that person's mouth may be determined and then simulated at a location apart from the person. It is to be noted that the pointers 14 are adjusted to contact the skin so that the lateral width of that person's jaw at the hinge axis is also determined.

Appropriate cast models 16 and 17 are made of the upper and lower jaws, respectively, of the person. These models 16 and 17 may be made in any conventional manner with conventional materials and may be prepared before or after the heretofore described use of the face bow 10 to determine the hinge axis mounting.

The face bow 10 is then mounted on a support post 18 of a support table 19. The dental articulator, generally designated 20, of this invention is then appropriately positioned on the table 19 in proper orientation with respect to face bow 10.

The dental articulator 20 is generally comprised of an upper frame 21 and a lower frame 22 which may be of any convenient configuration such as the T-shape shown. The lower frame 22 may be provided with three adjustable support legs 23 for appropriately supporting and levelling the lower frame on table 19 to accomplish the desired alignment with the face bow 10. Similarly, the upper frame 21 may be provided with three support legs 24 for permitting the articulator 20 to be completely inverted and supported by these legs or for supporting frame 21 alone when that frame is removed and inverted as desired.

A pair of condyle posts 25 are movably mounted on the lower frame 22 in spaced relation. The condyle posts 25 are adjustably and movably mounted by any convenient means such as a threaded extension 26 on one end of each post extending through one of a pair of slots 27 provided in lower frame 22. The two slots 27 are laterally spaced and aligned with respect to each other. Wing nuts 28 are provided on threaded extensions 26 to secure the condyle posts 25 to frame 22 and permit ready adjustment of the condyle posts toward and away from each other within slots 27. The extending end of each condyle post 25, opposite the threaded extension 26, is provided with a relatively spherical condyle 29. Condyle heads of various shapes like those of human mandibles could be provided. Each of the condyles 29 is provided with a pin 30 extending outwardly in an opposite direction from the other condyle and approximately aligned with the center of the spherical condyle to which it is attached.

The condyle posts 25 are then adjusted laterally to the appropriate position by positioning frame 22 on table 19 and aligning the pointer 14 of the face bow 10 with the pins 30. The pins 30 are of an appropriate length such that the center of the spherical condyles 29 are spaced an appropriate distance from the pointers 14 to correspond approximately to the distance between the individual's skin and the center of his ball and socket joint on each side. When the condyle posts 25 are properly positioned, the wing nuts 28 may be tightened. The frame 22 may be provided with calibrations 31 along the slots 27 and the post 25 may be provided with a mark 32 so that the two condyle posts 25 may be centered with respect to the frame 22 and also their positions may be recorded and subsequently located for additional use of the articulator.

The frame 21 is provided with an angle guide 33 mounted on the opposite side of the frame as the legs 24. Guide 33 is positioned at an angle to the plane of frame 21 and this angle approximates the minimum angle between a horizontal plane and the plane of the human socket and ball joint. A pair of three sided open boxes 34 are adjustably mounted in the guide 33 with two of the sides of the box coplanar with the two legs of the angle guide 33 and the third side perpendicular to both of the other two sides of the box 34. It is to be noted that it is not essential to this invention that boxes 34 have three mutually perpendicular sides and that various shapes will be satisfactory. Each of the boxes 34 are adjustably mounted on guide 33 by any convenient means such as a threaded stud 35 extending through a slot 36 in the back leg of the guide 33 with a wing nut 37 for securing the open box 34 in the appropriate location. After the condyle posts 25 have been laterally adjusted as heretofore described, the upper frame 21 is set on top of the lower frame 22 with each of the open boxes 34 resting on top of a condyle 29. Each of the open boxes 34 are moved outwardly with wing nuts 37 loosened until each of the spherical condyles 29 engages all three sides of each open box 34, i.e., when the spherical condyle 29 is positioned in the corner of the three sided open box 34. The wing nuts 37 are then tightened. Calibrations may be provided adjacent slot 36 similar to calibrations 31 to permit lateral centering of the boxes 34 with respect to frame 21 and recording for subsequent relocation of the boxes. With the condyle post 25 and open boxes 34 thus positioned, it may be seen that a rather crude ball and socket hinge is formed between the frames 21 and 22 with the socket formed by the straight sides of the boxes 34 such that rearward, upward and straight lateral movement of lower frame 22 relative to upper frame 21 is prohibited but other movements of frame 22 are freely permitted. This simulates the centric position of the human mandible wherein rearward, upward and straight lateral movement of the lower jaw relative to the skull is prohibited and therefore is the only position which is statically reproducible.

Figure 2:
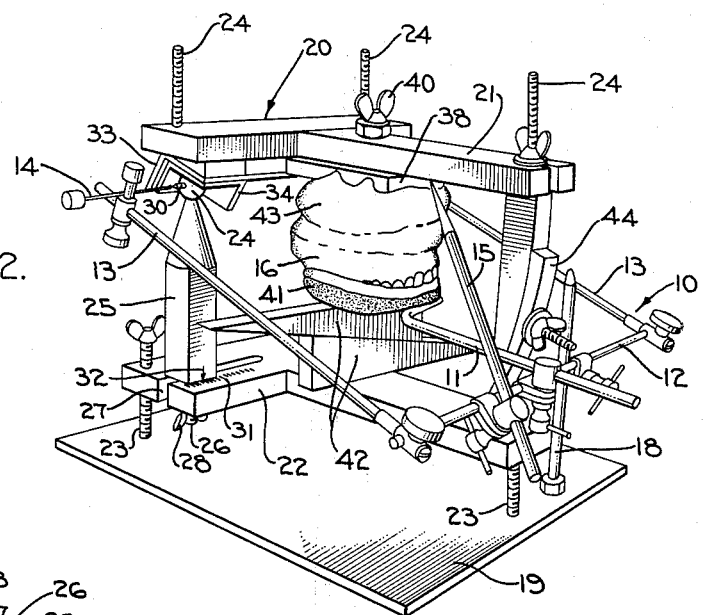
FIGURE 2 is a perspective view of the dental articulator of this invention together with the face bow shown in FIGURE 1 and illustrating one of the first steps in using the dental articulator.

An incisal pin guide 44 is mounted on the front end of upper frame 21 remote from angle guide 33. Incisal pin guide 44 is adjustable in length and serves the same well known functions of incisal pin guides of other dental articulators. One of such functions is separating frames 21 and 22 by the appropriate distance to correspond to the separation between the patient's upper and lower jaws. The length of incisal pin guide 44 is adjusted to engage a guide socket 45 mounted on frame 22 while the articulator 20 is positioned on the plate 19 with the face bow 10 and cast model 16 in place as shown in FIGURE 2.

The next step in the use of articulator 20 is to mount the cast model 16 of the upper jaw in the upper frame 21. A plate 38 may be provided and have a threaded hole (not shown) for receiving the threaded thumb screw 40 passing through frame 21. Mating holes and pins (both not shown) may be provided on the plate 38 and frame 21, respectively, for preventing relative movement therebetween upon tightening of screw 40. The cast model 16 is supported in the impression 41 which is in turn supported on the support rod 11 of the face bow 10. For convenience the weight of cast model 16 and impression 41 may be supported on the lower frame 22 by means of a pair of wedges 42 appropriately adjusted to engage the underside of impression 41. Incisal guide pin 44 is adjusted so that the hinge position of upper frame 21 is either touching pointer 15 or is set at a recordable distance from pointer 15. The instrument might be provided with a swinging arm, the bottom of which would be the same vertical distance from frame 21 as center of pin 30 is from frame 21. The cast model 16 is then secured to plate 38 by any convenient means such as a quantity of hard setting plaster 43 appropriately filling the space between the cast model and the plate. It is to be noted that the upper cast model 16 is now mounted in the articulator 20 in appropriate spatial relationship and distance with respect to the ball and socket joint formed by condyles 29 and boxes 34. Any of several other known methods of orienting the upper model may be used without departing from this invention.

Figure 3:
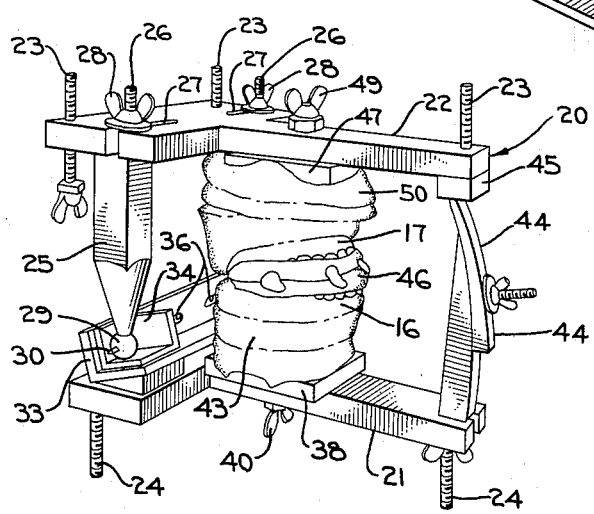
FIGURE 3 is a perspective view of the dental articulator in an inverted position from that shown in FIGURE 2 and showing another step in using the dental articulator.

The articulator 20 is then inverted and the cast model 17 of the lower jaw is mounted on the cast model 16 with a check bite 46 positioned therebetween to assure proper location, as shown in FIGURE 3. Check bite 46 is made in any convenient manner well known to those skilled in the art. A plate 47 is mounted on the frame 22 by means of a threaded thumb screw 49 passing through a hole in frame 22 into a threaded hole in plate 47. Mating holes and pins (both not shown) may be provided in plate 47 and frame 22 for maintaining orientation. The cast model 17 of the lower jaw is then secured to the plate 47 by any convenient means such as filling the space therebetween with a quantity of hard setting plaster 50.

Referring now to FIGURE 5, a "chew-in" impression is made of the particular individual's jaw movement. A plate 51 is made to fit the teeth or gums of the upper jaw of the individual and four metal studs 52 are mounted in spaced relationship in the plate 51. The studs 52 are preferably of a square or triangular cross-section having sharp corners with one of such corners facing forward when the plate is mounted in the individual's mouth. The studs 52 protrude a short distance from the surface of plate 51, generaly less than ⅛". A lower plate 53 is made to fit the teeth or gums of the lower jaw of the individual and the upper surface may be covered with a layer of impression compound if desired. The surfaces of plates 51 and 53 may be of any convenient mating shape but preferably are relatively spherical approximating the surface of an 8" diameter sphere with the surface of plate 51 being convex and the surface of plate 53 being concave. With the plates 51 and 53 mounted in the individual's mouth, the individual closes his mouth so that studs 52 engage the surface of plate 53 and the individual then moves his lower jaw to its extreme positions in all directions. This relative movement between plates 51 and 53 causes the studs 52 to scribe paths 54 in the surface of plate 53. By using the impression compound heretofore mentioned these paths may be made more easily. The plates 51 and 53 are then removed from the individual's mouth and if an impression compound has been used on the surface of plate 53, a hard plastic reproduction is made of this plate. Plates 51 and 53 are then mounted in the cast models 16 and 17, respectively, of the upper and lower jaws of the individual as shown in FIGURE 5; these models 16 and 17 having been mounted in frame 21 and 22, respectively, which are not shown in FIGURE 5. When the studs 52 are positioned in the front corners 55 of the path 54 the lower jaw is in what is commonly known as the "centric position" i.e., where the lower jaw is in the most retruded position. By positioning studs 52 in corners 55 the proper positioning of lower cast model 17 may be checked and adjusted since this position will be represented by each of the condyles 29 engaging all three sides of each of the open boxes 34.

A check which may be performed is by removing frame 21 and using a compass or pair of dividers with one point held on one condyle 29 and striking an arc adjacent the paths 54 beginning at the forward corner 55 of each. Although paths 54 are shown as relatively square and regular these paths will be irregular and different sizes and shapes for different individuals. The two forward sides 60 of the paths 54 are generally arcuate and if the positioning of condyle posts 25 are correct, the arc struck by the compass or divider will coincide with these sides 60. If the arcs 60 gradually lengthen it indicates greater "Bennet movement" or side shift of the mandible. As the one condyle moves forward the other may move outward and upward, outward and downward, outward and backward, or outward and forward.

The dental articulator 20 is then placed in an upright position with frame 21 above frame 22, and frame 21 is manually moved relative to frame 22 with studs 52 following the edges of paths 54. The condyles 29 will obviously move relative to the associated open boxes 34 and if tracing the paths 54 by the studs 52 is limited by one or the other of the condyles 29 engaging one or more of the sides of the open boxes 34, such sides of the boxes 34 must be relieved such as by grinding. It is to be noted that the corners of the open boxes do not need relieving at the three points of contact with the condyle 29 since this is the starting position and has been adjusted to conform to the centric position with the studs 52 engaging the forward corners 55 of the paths 54. By providing open boxes 34 with appropriately angled or relieved sides except at this centric position with the condyle 29 engaging all three sides, it is apparent that this grinding step can be virtually eliminated.

The frame 21 is then lifted off the frame 22 and the boxes 34 are partially filled with a soft formable material 56 such as a wax heated to the appropriate temperature. The upper frame 21 is then replaced on the lower frame 22 and manipulated to the centric position so that condyles 29 displace some of the material 56 to assume their position of engaging the three sides of each box 34. The upper frame 21 is then manually moved with respect to frame 22 with the studs 52 following the paths 54 formed in the lower plate 53. It may be seen that since there are four studs 52 and four paths 54, and if interengagement between the studs and paths is maintained the relative positions and movement between the upper frame 21 and the lower frame 22 is continually maintained even though the condyles 29 do not engage the sides of the open boxes 34 nor does the incisal pin guide 44 engage the guide socket 45. This relative movement causes the condyles 29 to form irregular paths 57 in the material 56 by displacing and molding the material. Since the plates 51 and 53 are being manually moved in the identical relationship as they were moved by the individual's own jaw when the plates were mounted in the mouth, the paths 57 formed by the condyles 29 are a replica and cooperate with condyles 29 in identical fashion to the cooperation between the ball and socket joints between the lower jaw and the skull of that individual. These paths 57 are irregular and vary from individual to individual. Moreover, for any one individual the two paths 57 on either side may be substantially different and not merely mirror images of each other.

The open boxes 34 may then be removed from frame 21 for convenience and a form die 58 made of each of the paths 57 and its relationship to the box 34. Die 58 may be made in conventional fashion such as through the use of dental stone and conforms to the path 57 as shown in FIGURE 7. After removal of die 58 the formable material 56 is removed from box 34 and the box is then filled with a hard setting material 59 such as various types of cold cure plastics. Die 58 is then forced into material 59 in appropriate orientation with respect to box 34 and thereby reproduces path 57 in the material 59; the start of this step being shown in FIGURE 8. Conventional parting compounds may be used on the material 56 and die 58 in the heretofore described steps.

After the material 59 has hardened the die 58 may be removed and the boxes 34 reinstalled in the guide 33 in their appropriate locations. The hard plastic plate 53 may then be replaced by the original soft impression compound plate 53 in which were formed the paths 54 and the appropriate positioning of the lower cast model 17 may be remounted with plaster. Models with natural posterior teeth should be remounted with a new "check bite."

The plates 51 and 53 may be then removed and the articulator 20 with the properly mounted cast models 16 and 17 is essentially shown by FIGURE 4. Incisal pin guide 44 is then adjusted to the desired length and a contoured socket 61 may be formed in the guide socket 45 to give the desired mouth opening and bite characteristics as is well known to those skilled in the art. With these adjustments made the desired dentures, bridges, caps, etc. may be constructed on the cast models 16 and 17 and this work is facilitated by the fact that frame 21 can be easily lifted off and replaced on frame 22 for accomplishing detailed work on either of the cast models 16 or 17. If it is desirable or necessary to use the articulator 20 for constructing dentures, etc. for a different person, the cast models 16 and 17 may be removed by merely removing wing nuts 40 and 49, open boxes 34 may be removed by removing wing nuts 37, socket guide 45 can be removed (means not being shown), and the positions of each of these and the positions of condyle posts 25 and incisal pin guide 44 may be recorded so that each may subsequently be replaced for continued work thereon.

Thus, it may be seen that a dental articulator and method are provided which are relatively easy to use and yet the actual jaw movements of any individual are more accurately reproduced. Further, the articulator is relatively inexpensive to construct and the materials and additional equipment needed are presently used and available to most dentists.

Having fully described my invention it is to be understood that I do not wish to be limited to the details herein set forth or to the details illustrated in the drawings, but my invention is of the full scope of the appended claims.

I claim:

1. A dental articulator for reproducing the movements of a human jaw, comprising: a lower frame and an upper frame for simulating the lower and upper human jaws respectively, said frames having forward and rearward portions, a pair of condyle means movably mounted on the rearward portion of said lower frame, a pair of open boxes movably mounted on the rearward portion of said upper frame, said open boxes positioned on said upper frame for fitting over said condyle means, each said open box having an abutment corner portion with abutment wall means engaging and mating with the associated said condyle means in a centric position and preventing movement of that condyle means relative to that open box in the direction upward toward that open box and the direction inward toward the other said open box and the direction rearward of said upper frame while permitting relative movement in all other directions from said centric position, means for supporting the forward portions of said upper and lower frames relative to each other, a formable material in each of said open boxes, and means mounted on said upper and lower frames to permit a confined relative movement between said frames to cause said condyle means to form a path within said formable material whereby subsequent relative movement following said path reproduces the movement of the jaw.

2. A dental articulator for reproducing the movements of a human jaw, comprising: a lower frame and an upper frame, for simulating the lower and upper human jaws respectively, said frames having forward and rearward portions, a pair of condyle means mounted on the rearward portion of said lower frame and extending upwardly toward said upper frame, a pair of open boxes mounted on the rearward portion of said upper frame, said open boxes being open downwardly for fitting over said condyle means and supporting said upper frame on said condyle means, each said open box having an abutment corner portion with abutment wall means engaging and mating with the associated said condyle means in a centric position and preventing movement of that condyle means relative to that open box in the direction upward toward that open box and the direction inward toward the other said open box and the direction rearward of said upper frame while permitting relative movement in all other directions from said centric position, means for supporting the forward portions of said upper and lower frames relative to each other, a formable material in each of said open boxes, and means mounted on said upper and lower frames to permit a confined movement of said upper frame relative to said lower frame for moving said condyle means within said open boxes to form a path within said formable material for accurately reproducing that confined movement and related jaw movements upon manipulation of said upper frame relative to said lower frame solely by said condyle means following said path.

3. A dental articulator for reproducing the movements of a human jaw, comprising: a lower frame and an upper frame for simulating the lower and upper human jaws respectively, said frames having forward and rearward portions, a pair of condyle posts movably mounted on the rearward portion of said lower frame for movement toward and away from each other, each said condyle post extending upwardly and having a spherical condyle at the upper end, a pair of open boxes movably mounted on the rearward portion of said upper frame for fitting over said spherical condyles and supporting said upper frame on said condyle posts, each said open box having an abutment corner portion with abutment wall means engaging and mating with the associated said spherical condoyle in a centric position and preventing movement of that spherical condoyle relative to that open box in the direction upward toward that open box and the direction inward toward the other said open box and the direction rearward of said upper frame while permitting relative movement in all other directions from said centric position, means for supporting the forward portions of said upper and lower frames relative to each other, a formable material in each of said open boxes, and means mounted on said upper and lower frames to permit a confined movement of said upper frame relative to said lower frame for moving said spherical condyles within said open boxes to form a path within said formable material for accurately reproducing that confined movement and related jaw movements upon manipulation of said upper frame relative to said lower frame solely by said spherical condyles following said paths.

4. A dental articulator for reproducing the movements of a human jaw, comprising: a lower frame and an upper frame for simulating the lower and upper human jaws respectively, said frames having forward and rearward portions, cast models of the upper and lower human jaws, means for mounting said cast models on said upper and lower frames, respectively, a pair of condyle posts movaly mounted on the rearward portion of said lower frame for movement toward and away from each other, each said condyle post extending upwardly and having a spherical condyle at the upper end, a pair of open boxes movably mounted on the rearward portion of said upper frame for movement toward and away from each other, said open boxes positioned on said upper frame for fitting over said spherical condyles and supporting said upper frame on said condyle posts, each said open box having an abutment corner portion with abutment wall means engaging and mating with the associated said spherical condyle in a centric position and preventing movement of that spherical condyle relative to that open box in the direction upward toward that open box and the direction inward toward the other said open box and the direction rearward of said upper frame while permitting relative movement in all other directions from said centric position, an incisal pin guide mounted on said upper frame remote from said open boxes for engaging said lower frame to separate said frames, a formable material in each of said open boxes, and means mounted on said cast models of the upper and lower human jaw to permit a confined movement of said upper frame relative to said lower frame for moving said spherical condyles within said open boxes to form a path within said formable material for accurately reproducing that confined movement and related jaw movements upon manipulation of said upper frame relative to said lower frame solely by said spherical condyles following said paths.

5. A dental articulator for reproducing the movements of a human jaw, comprising: a lower frame and an upper frame for simulating the lower and upper human jaws respectively, said frames having forward and rearward portions, a pair of condyle posts movably mounted on the rearward portion of said lower frame for movement toward and away from each other, each said condyle post extending upwardly and having a spherical condyle at the upper end, a pair of open boxes movably mounted on the rearward portion of said upper frame for movement toward and away from each other, said open boxes positioned on said upper frame for fitting over said spherical condyles and supporting said upper frame on said condyle posts, each said open box having an abutment corner portion with abutment wall means engaging and mating with the associated said spherical condyle in a centric position and preventing movement of that spherical condyle relative to that open box in the direction upward toward that open box and the direction inward toward the other said open box and the direction rearward of said upper frame while permitting relative movement in all other directions from said centric position, means for supporting the forward portions of said upper and lower frames relative to each other, means mounted on said upper and lower frames to permit a confined movement of said upper frame relative to said lower frame for moving said spherical condyles within said open boxes, and a hard material in each of said open boxes having paths formed therein corresponding to that confined movement for reproducing the jaw movements upon manipulation of said upper frame.

6. A dental articulator for reproducing the movements of a human jaw, comprising: a lower frame and an upper frame for simulating the lower and upper human jaws respectively, said frames having forward and rearward portions, a pair of condyle posts movably mounted on the rearward portion of said lower frame for movement toward and away from each other, each said condyle post extending upwardly and having a spherical condyle at the upper end, a pointed pin extending radially outwardly from each spherical condyle a preselected distance approximating the human skin-to-condyle distance, a pair of open boxes movably mounted on the rearward portion of said upper frame for fitting over said spherical condyles and supporting said upper frame on said condyle posts, each said open box having an abutment corner portion comprising abutment wall means engaging and mating with the associated said spherical condyle in a centric position and preventing movement of that spherical condyle relative to that open box in the direction upward toward that open box and the direction inward toward the other said open box and the direction rearward of said upper frame while permitting relative movement in all other directions from said centric position, a formable material in each of said open boxes, means for supporting the forward portions of said upper and lower frames relative to each other, and means mounted on said upper and lower frames to permit a confined movement of said upper frame relative to said lower frame for moving said spherical condyles within said open boxes to form a path within said formable material for accurately reproducing that confined movement and related jaw movements upon manipulation of said upper frame relative to said lower frame solely by said spherical condyles following said paths.

References Cited by the Examiner

UNITED STATES PATENTS

| | | | |
|---|---|---|---|
| 1,622,910 | 3/27 | Homer | 32—32 |
| 1,670,311 | 5/28 | Musante | 32—32 |
| 2,754,589 | 7/56 | Highkin | 32—32 |
| 2,816,360 | 12/57 | Stuart | 32—32 |
| 3,052,030 | 9/62 | Spence | 32—32 |

FOREIGN PATENTS

| | | |
|---|---|---|
| 433,164 | 8/26 | Germany. |
| 544,125 | 2/32 | Germany. |

RICHARD A. GAUDET, *Primary Examiner.*